United States Patent
Shingu

(10) Patent No.: US 7,712,903 B2
(45) Date of Patent: May 11, 2010

(54) REMOTE INSTRUCTION SYSTEM, REMOTE INSTRUCTION METHOD AND PROGRAM PRODUCT FOR REMOTE INSTRUCTION

(75) Inventor: Jun Shingu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 929 days.

(21) Appl. No.: 11/487,570

(22) Filed: Jul. 17, 2006

(65) Prior Publication Data

US 2007/0171283 A1    Jul. 26, 2007

(30) Foreign Application Priority Data

Jan. 26, 2006  (JP) .............................. 2006-017022

(51) Int. Cl.
G03B 21/08 (2006.01)
(52) U.S. Cl. .................................. 353/122; 348/211.1
(58) Field of Classification Search ................. 352/122; 348/211.99, 211.1–211.14; 345/625
See application file for complete search history.

(56) References Cited

U.S. PATENT DOCUMENTS

| | | | | |
|---|---|---|---|---|
| 7,314,283 | B2 * | 1/2008 | Tsukada ..................... 353/121 |
| 7,333,135 | B2 * | 2/2008 | Foote et al. ............ 348/211.12 |
| 2002/0051001 | A1 * | 5/2002 | Kanai ......................... 345/591 |
| 2004/0070674 | A1 | 4/2004 | Foote et al. |

FOREIGN PATENT DOCUMENTS

CN    1325085 A    12/2001

* cited by examiner

*Primary Examiner*—Georgia Y Epps
*Assistant Examiner*—Jerry Brooks
(74) *Attorney, Agent, or Firm*—Oliff & Berridge, PLC

(57) ABSTRACT

A remote instruction system includes a control portion. The control portion transmits an image captured by an image capturing portion provided for capturing the image of a subject to a remote terminal, and controls a projection portion to project an annotation image onto the subject according to an instruction issued from the remote terminal on the basis of the image captured. The control portion measures a reflection characteristic of a surface of the subject on the basis of the image captured, and converts a color of the annotation image to be projected onto the subject on the basis of a comparison result between the color of the annotation image instructed by the remote terminal and the reflection characteristic of the surface of the subject to project the annotation image onto the subject.

12 Claims, 8 Drawing Sheets

REMOTE INSTRUCTION SYSTEM, REMOTE INSTRUCTION METHOD AND PROGRAM PRODUCT FOR REMOTE INSTRUCTION

BACKGROUND

1. Technical Field

This invention generally relates to a remote instruction system and a remote instruction method.

2. Related Art

In a remote conference system, various instructions have to be given to a real object side from a remote side. As an example of the remote instruction system where an instruction can be given from the remote side to the real object side, there is known a technique of projecting an annotation image determined on a remote terminal on the basis of a captured image onto a target object from a projector on the real object side, while the target object existent on the real world side is being captured by a camcorder and such captured image being transmitted to the remote terminal.

SUMMARY

An aspect of the invention provides a remote instruction system comprising a control portion. The control portion transmits an image captured by an image capturing portion provided for capturing the image of a subject to a remote terminal, and controls a projection portion to project an annotation image onto the subject according to an instruction issued from the remote terminal on the basis of the image captured. The control portion measures a reflection characteristic of a surface of the subject on the basis of the image captured, and converts a color of the annotation image to be projected onto the subject on the basis of a comparison result between the color of the annotation image instructed by the remote terminal and the reflection characteristic of the surface of the subject to project the annotation image onto the subject.

BRIEF DESCRIPTION OF THE DRAWINGS

Embodiments of the present invention will be described in detail based on the following figures, wherein.

DETAILED DESCRIPTION

Figure 1:
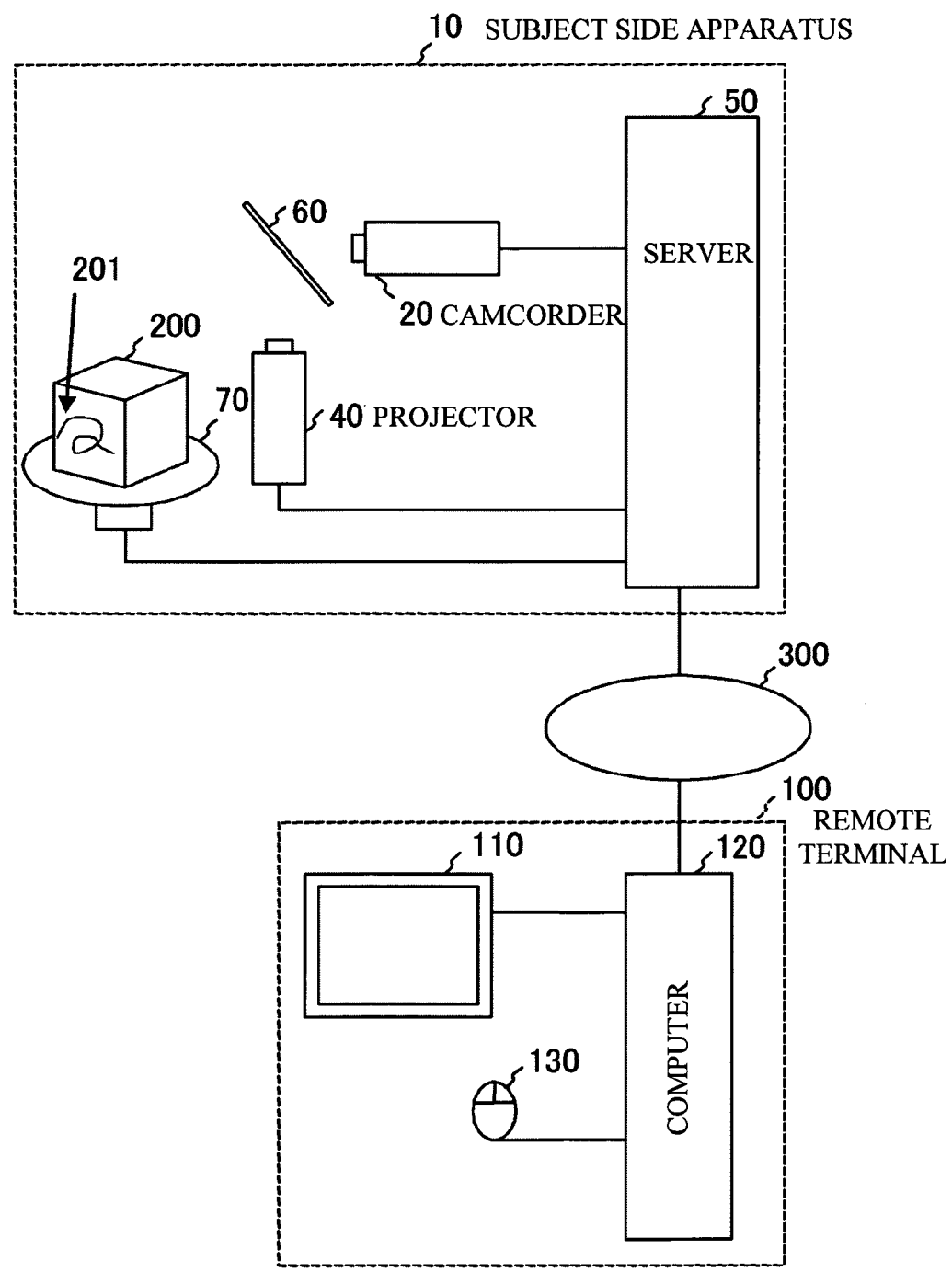
FIG. 1 is a configuration diagram illustrating an exemplary embodiment of a remote instruction system.

A description will now be given, with reference to the accompanying drawings, of embodiments of the present invention. FIG. 1 is a configuration diagram illustrating an exemplary embodiment of a remote instruction system 1. The remote instruction system 1 includes a subject side apparatus 10 and a remote terminal 100. The subject side apparatus 10 and the remote terminal 100 are connected to each other to enable mutual communication by a network 300. In FIG. 1, only one remote terminal 100 is shown, however, multiple remote terminals 100 can be connected to a server 50, as will be discussed later, of the subject side apparatus 10 through the network 300.

The subject side apparatus 10 is composed of a camcorder 20 serving as an image capturing portion, a projector 40 serving as a projection portion, the server 50 serving as a control portion, a half mirror 60, and a rotation stage 70 serving as a relative position changing portion. The camcorder 20 is composed of a CCD camera, for example, to capture a subject (target object) 200 placed on the rotation stage 70, while information of such captured image is being taken into the server 50. The camcorder 20 captures an image transmitted through the half mirror 60.

The projector 40 is composed of a liquid crystal projector or the like, and projects an annotation image 201 onto the subject 200, according to an instruction given from the remote terminal 100 on the basis of a captured image. In addition, the projector 40 is arranged in such a manner that an optical system thereof is substantially aligned with an optical principal point of the camcorder 20 by the half mirror 60. The projector 40 projects the annotation image transmitted from the server 50 onto the subject 200 through an optical system thereof and the half mirror 60. The annotation image projected from the projector 40 is reflected by the half mirror 60 and projected onto the subject 200. The annotation image includes any type of image such as line, character, drawing, and the like.

The rotation stage 70 is controlled by the server 50, and the subject 200 placed on a top surface of the rotation stage 70 is rotated, so that the position of the subject 200 with respect to the camcorder 20 and the projector 40 is changed. The server 50 controls operations of the camcorder 20, the projector 40, and the rotation stage 70, while sending and receiving various information to and from the remote terminal 100 over the network 300.

The server 50 sends the image captured by the camcorder 20 to the remote terminal 100, and projects the annotation image onto the subject 200, according to an instruction issued by the remote terminal 100 on the basis of such captured image. The server 50 controls to change a projection position of the annotation image, which is projected by the projector 40, in accordance with the rotation (movement) of the subject 200 placed on the rotation stage 70.

The remote terminal 100 is composed of a display apparatus 110, a computer 120, a pointing device (mouse) 130, and the like. The display apparatus 110 is composed of a liquid crystal display, CRT, or the like. The computer 120 is connected to the network 300. The pointing device 130 is connected to the computer 120. The display apparatus 110 displays an image transmitted from the subject side apparatus 10, on a display screen thereof. The pointing device 130 is used for operating various buttons by means of a pointer on the display screen on which the captured image is being displayed, so as to create an instruction with respect to the annotation image to be projected onto the subject 200. The pointing device 130 is also used for giving an instruction to rotate the subject 200 with the use of the rotation of the rotation stage 70.

Figure 2:
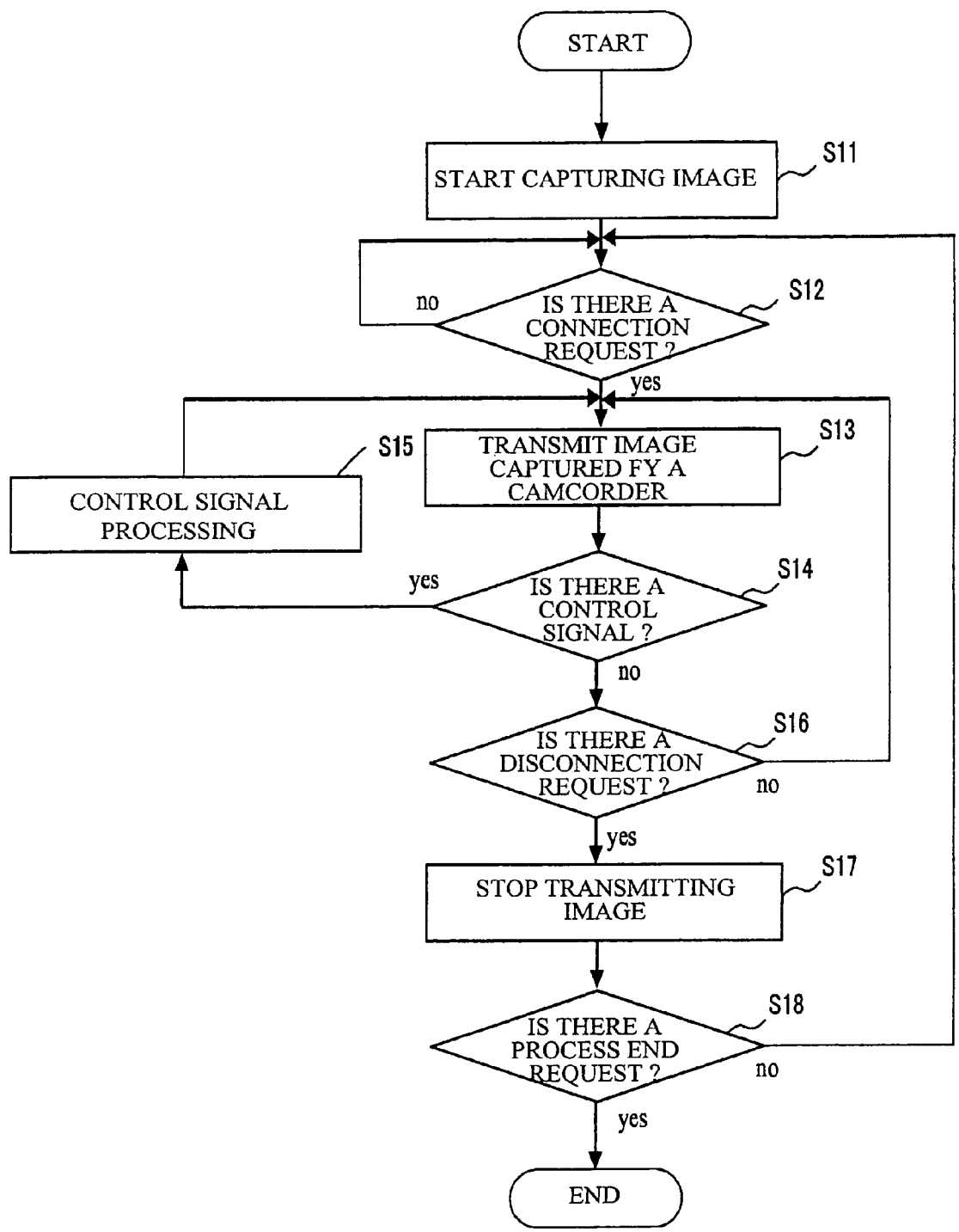
FIG. 2 is a flowchart showing an example process on a server of a subject side apparatus.
Figure 3:
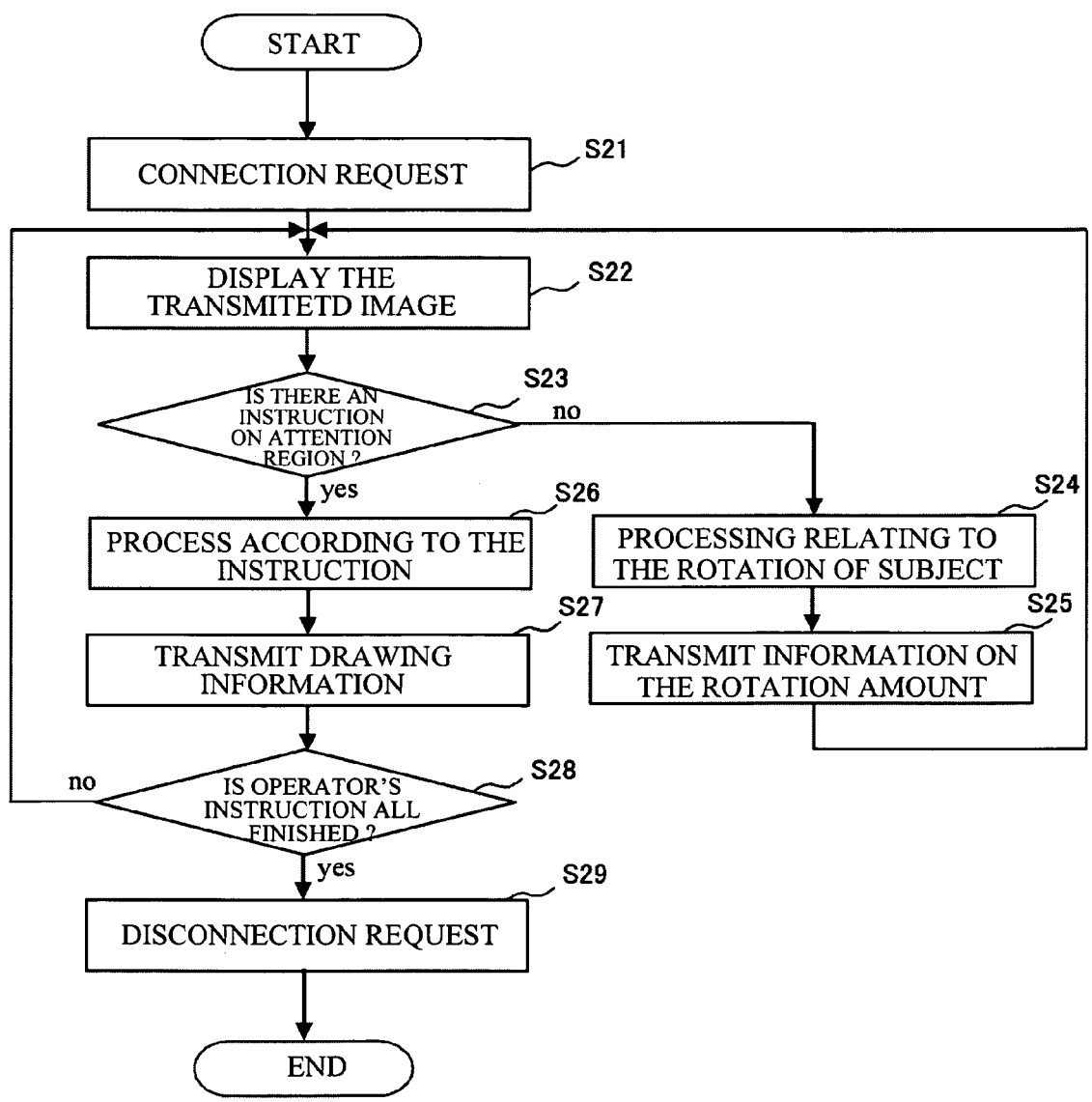
FIG. 3 is a flowchart showing an example process of forming an image on a computer of a remote terminal.
Figure 4:
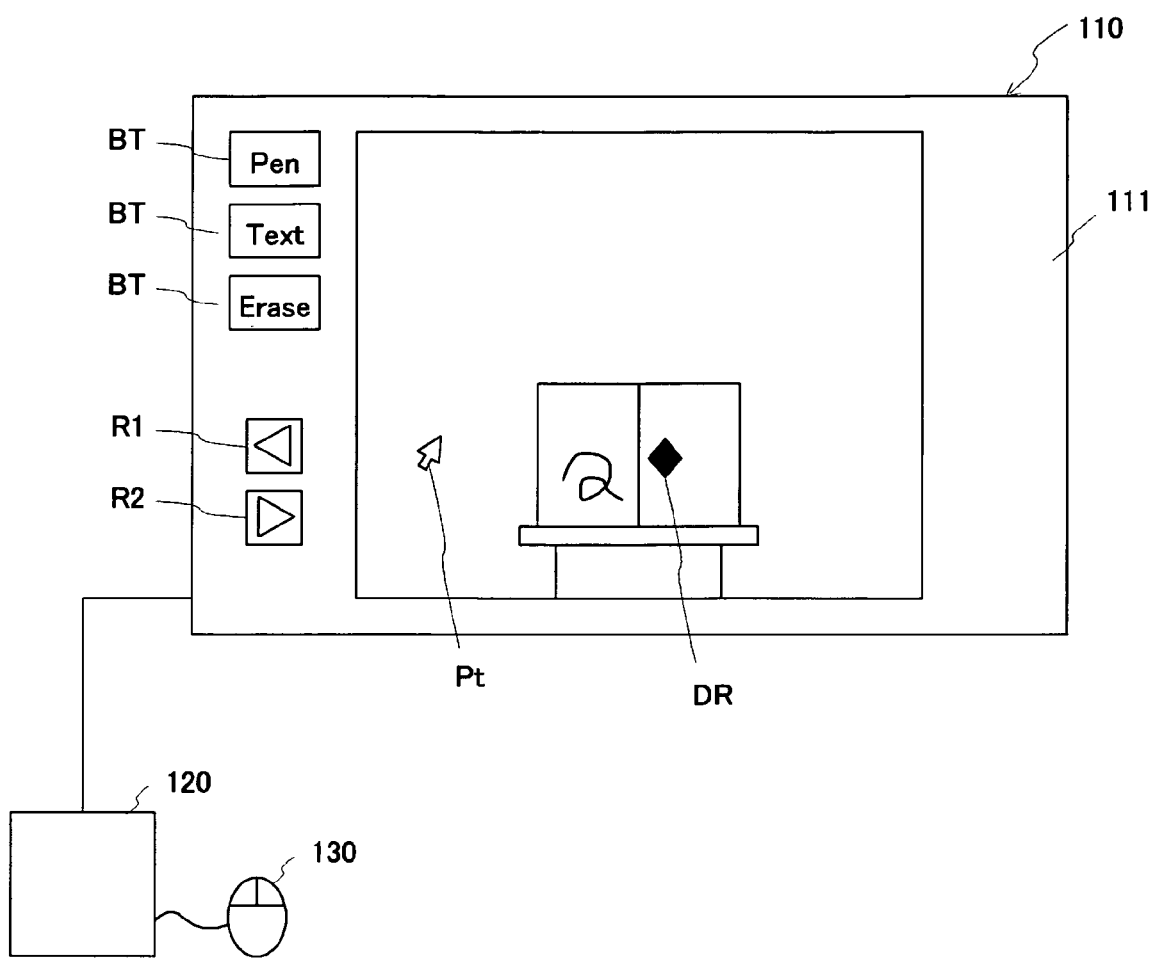
FIG. 4 is a view illustrating an example operation on the side of the remote terminal.

Next, operations of the remote instruction system 1 having the above-described configuration are described with reference to FIG. 2 through FIG. 4. FIG. 2 is a flowchart showing an example process on the server 50 of the subject side apparatus 10. FIG. 3 is a flowchart showing an example process of forming an image on the computer 120 of the remote terminal 100. FIG. 4 is a view illustrating an example operation on the side of the remote terminal 100.

Referring now to FIG. 2, the server 50 of the subject side apparatus 10 starts capturing an image by means of the camcorder 20 (step S11), and determines whether or not there is a connection request from the computer 120 of the remote terminal 100 (step S12). If there is a connection request from the computer 120, the server 50 transmits the image captured by the camcorder 20 to the computer 120 of the remote terminal 100 through the network 300 (step S13).

Subsequently, the server 50 determines whether or not there is a transmission of a control signal from the computer 120 (step S14). The control signal includes a drawing signal and a position control signal, the drawing signal being information on drawing of the annotation image, the position control signal being provided for rotating the rotation stage 70. If the server 50 receives the afore-described control signal, the server 50 performs a control signal processing according to the content of the control signal (step S15).

Meanwhile, if the server 50 does not receive the above-described control signal, the server 50 determines whether or not there is a disconnection request (step S16). If there is no disconnection request, the server 50 goes back to step S13 and transmits a newly captured image to the computer 120 of the remote terminal 100 through the network 300. If there is a disconnection request, the server 50 stops transmitting the image captured by the camcorder 20 (step S17). Then, the server 50 determines whether or not there is a process end request (step S18). If there is no end request, processing goes back to step S12 to repeat the above-described processes. If there is a process end request, processing is terminated.

Next, a description is given of the operation of the remote terminal 100. Firstly, as shown in FIG. 3, the computer 120 of the remote terminal 100 issues a connection request to the server 50 (step S21). Then, after the connection is established, for example, as shown in FIG. 4, the computer 120 displays the captured image being transmitted from the server 50 of the subject side apparatus 10 on a display screen 111 of the display apparatus 110 (step S22).

Subsequently, the computer 120 determines whether or not there is an instruction on an attention region in the captured image given by an operator (step S23). If there is an instruction on the attention region, the process according to the instruction is performed (step S26). Specifically, if there is a region in the image being displayed onto which the operator likes to project the annotation image, the operator of the remote terminal 100 operates the pointing device 130 to move a pointer Pt on the display screen 111 and issues an instruction on the attention region, while watching the image on the display screen 111 of the display apparatus 110, as shown in FIG. 4. The attention region is a region that defines a projection position onto which an annotation image DR is to be projected. At this time, the operator simultaneously issues an instruction of the information on the annotation image to be projected onto the attention region.

For example, it is possible to instruct graphic information such as drawn rectangle or circle, bitmap images prepared in advance, text information input from the keyboard, by operating various buttons BT or the like formed on the display screen The computer 120 transmits various types of information specified at step S26 to the server 50 as drawing information (step S27).

Next, the computer 120 determines whether or not the operator's instruction issued from the remote terminal 100 on the basis of the image captured by the camcorder 20 has been completed (step S28). If the instruction is completed, a disconnection request is issued to the server 50 (step S29) and the processing is terminated. If the instruction issued by the operator of the remote terminal 100 is not completed, processing goes back to step S22 to repeat the above-described processes.

Here, if the operator of the remote terminal 100 likes to rotate the subject 200, the operator operates rotation buttons R1 and R2 to instruct a rotation direction and rotation amount of the rotation stage 70, while watching the image being displayed on the display screen 111 as shown in FIG. 4, so that the region in the subject 200 in the captured image onto which the operator likes to project the annotation image may be displayed or a viewing location of the subject 200 may be most appropriate. The rotation buttons R1 and R2 are provided on the display screen 111 to rotate the rotation stage 70. At step S23, if there is no instruction on the attention region (there is no instruction on the annotation image), the computer 120 determines that an instruction on the rotation of the subject 200 is to be given, and performs processing relating to the rotation of the subject 200 (step S24).

Then, the computer 120 transmits information on the rotation mount (movement amount information), which has been obtained by the process relating to the rotation of the subject 200, to the server 50 of the subject side apparatus 10 (step S25). This rotates the rotation stage 70 and changes the rotation position of the subject 200 on the subject side apparatus 10. A newly captured image is displayed on the display apparatus 110 of the remote terminal 100 (step S22).

Figure 5:
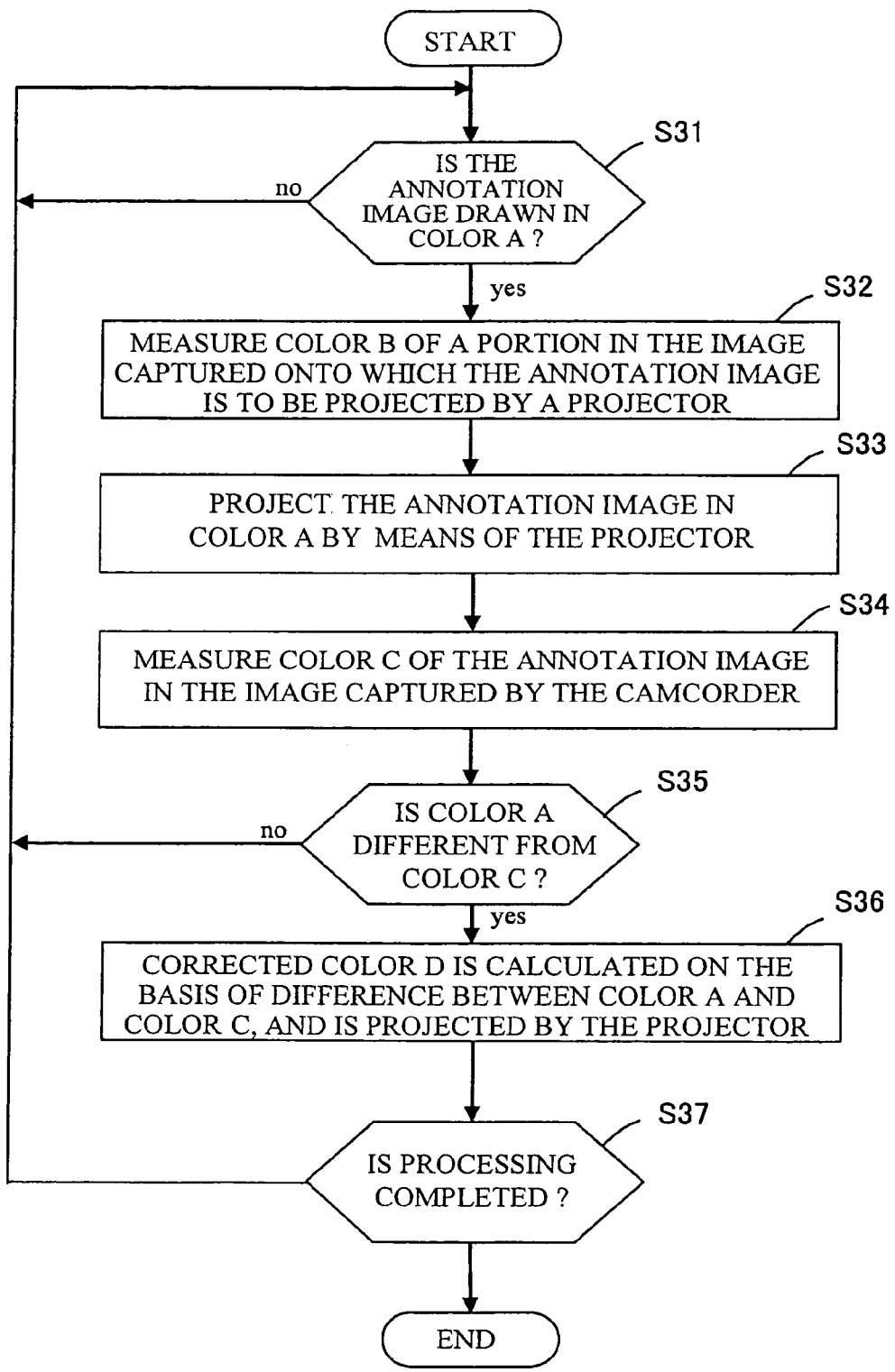
FIG. 5 is a process flowchart showing a case where a color of an annotation image is converted and then the annotation image is projected in the remote instruction system.

Next, a description is given of the operation of a case where the annotation image is converted according to a reflection characteristic of a subject surface and is then projected. FIG. 5 is a process flowchart showing a case where the color of the annotation image is converted and the annotation image is then projected in the remote instruction system. The color may be expressed, for example, in three primary colors of R (red), G (green), and B (blue). "Color of object" is a human's reaction when a light emitted from a light source is reflected on a surface of "object", and enters into human eyes. Accordingly, "color" is a "light", and "color of object" is a reflection characteristic on the surface of the object. This is the fundamental in the feel of material.

Figure 6A:
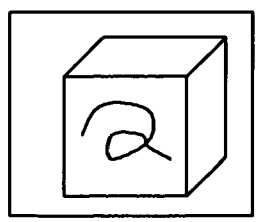
FIG. 6A is a view illustrating the annotation image determined on a remote terminal.
Figure 6B:
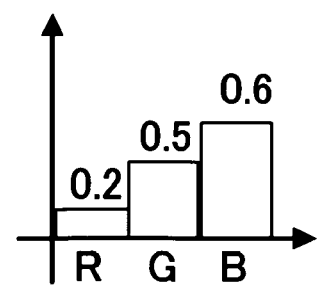
FIG. 6B is a view illustrating color components (color A) of the annotation image determined on the remote terminal.

Firstly, the user in a remote site issues an instruction of drawing the annotation image in a color A, with the use of the pointing device 130 or the like on the remote terminal 100. FIG. 6A is a view illustrating the annotation image determined on a remote terminal. FIG. 6B is a view illustrating a color component (color A) of the annotation image determined on the remote terminal. As shown in FIG. 6B, the color components of the annotation image determined by the color A are expressed in R=0.2, G=0.5, and B=0.6.

Figure 7A:
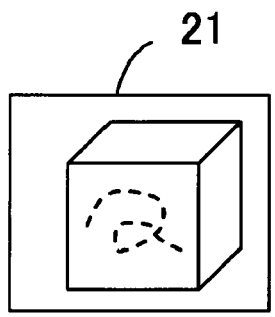
FIG. 7A is a view illustrating a portion of the subject surface onto which the annotation image is to be projected.
Figure 7B:
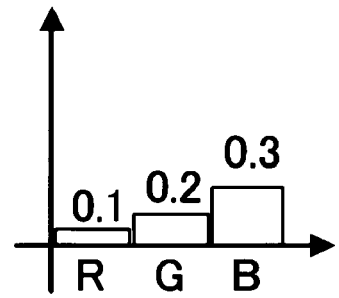
FIG. 7B is a view illustrating the color components (color B) of the subject on a portion in the image onto which the annotation image is projected.

If it is determined that the annotation image is drawn in the color A on the remote terminal 100 (step S31), the server 50 measures the reflection characteristic of a portion on the surface of the subject onto which the annotation image is to be projected, namely, a color B of a portion in the image captured by the camcorder 20 onto which the annotation image is to be projected (step S32). FIG. 7A is a view illustrating a portion of the subject surface onto which the annotation image is to be projected. FIG. 7B is a view illustrating a color components (color B) of the subject on a portion in the image onto which the annotation image is projected. As shown in FIG. 7B, it is expressed that R=0.1, G=0.2, and B=0.3 are the color components of a portion on the subject in the image captured by the camcorder 20 onto which the annotation image is to be projected. Here, it is possible to cut out the annotation image from the captured image, since it is known at the stage of drawing which portion corresponds to the annotation image. Accordingly, it is possible to cut out the portion of the annotation image from the image captured by the camcorder 20. Then, the server 50 measures the color B of the annotation image that has been cut out.

Here, according to an exemplary embodiment, measured is the reflection characteristic of a portion of the subject onto which the annotation image is to be projected, in order to reduce a calculation amount. However, the reflection characteristics of all the subjects may be calculated. It is possible to cut out the portion of the captured image onto which the annotation image is to be projected, by measuring the color B of a place where the annotation image is to be projected in the color A, since it is known at the stage of drawing which portion in the captured image corresponds to the annotation image.

Next, the server 50 projects the annotation image onto the subject 200 in the color A instructed by the remote terminal 100, by means of the projector 40 (step S33). However, due to the reflection characteristic on the surface of the subject 200, it seems that the annotation image 201 is projected in a different color from the color A. Accordingly, the server 50 measures a color C of the annotation image 201 in the image captured by the camcorder 20 (step S34).

Figure 8A:
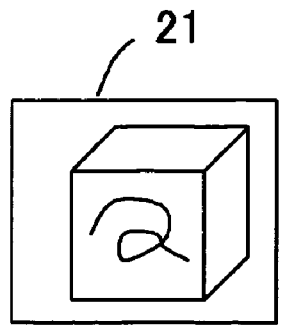
FIG. 8A is a view illustrating an annotation image in the image captured by the camcorder.
Figure 8B:
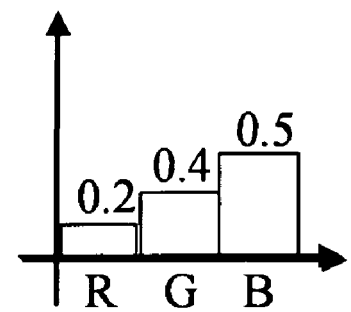
FIG. 8B is a view illustrating the color components (color C) of the annotation image in the image captured by the camcorder.

FIG. 8A is a view illustrating an annotation image in the image captured by the camcorder 20. FIG. 8B is a view illustrating color components (color C) of the annotation image in the image captured by the camcorder 20. As shown in FIG. 8B, the color components (the color C) of the annotation image in the image are expressed in R=0.2, G=0.4, and B=0.5. Here, it is possible to cut out the annotation image from the captured image, since it is known at the stage of drawing which portion in the captured image corresponds to the annotation image. It is therefore possible to cut out the portion of the annotation image from the image captured by the camcorder 20. Then, the server 50 measures the color C of the annotation image that has been cut out.

The server 50 determines whether the color A of the annotation image determined by the remote user on the remote terminal 100 is different from the color C of the annotation image in the image captured by the camcorder 20 (step S35). The server 50 dissolves the color A and the color C into color information of the RGB color space and compares the color information. Then, if it is determined that the color A of the annotation image determined by the remote terminal 100 is different from the color C of the annotation image in the image captured by the camcorder 20 ("yes" at step S35), the server 50 converts the color of the annotation image to be projected onto the subject 200, on the basis of a comparison result between the color A of the annotation image determined by the remote terminal 100 and the reflection characteristic (of the color C) on the subject surface. That is to say, the server 50 calculates a corrected color D according to the difference between the color A and the color C. Calculation equations of the color D are shown in a following expression (1).

$$R_D = \frac{R_A - R_B}{R_c - R_B} R_A$$
$$G_D = \frac{G_A - G_B}{G_c - G_B} G_A$$
$$B_D = \frac{B_A - B_B}{B_c - B_B} B_A$$

[Expression (1)]

Figure 9:
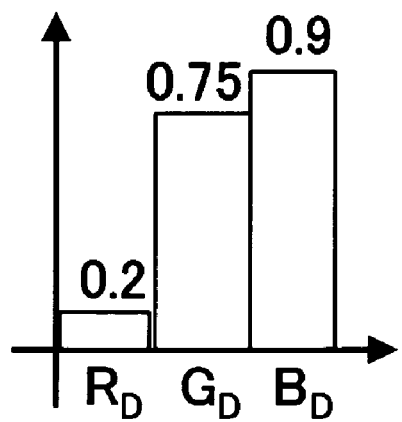
FIG. 9 is a view illustrating the color components (color D) of the corrected annotation image.

FIG. 9 is a view illustrating color components (the color D) of the corrected annotation image. As shown in FIG. 9, the color component (the color D) of the corrected annotation image is expressed in R=0.5, G=0.75, and B=0.9. Then, the server 50 projects the annotation image onto the subject 200 again with the use of the corrected color D, by means of the projector 40 (step S36). If the color correction process is completed ("yes" at step S37), the whole process is completed. In the remote instruction system 1, it is therefore possible to project the annotation image so as to have an actually determined color onto the surface having various reflection characteristics, since a reflection coefficient of the subject surface is measured and the color of the annotation image to be projected is adjusted in accordance with the reflection characteristic of the subject surface.

Figure 10:
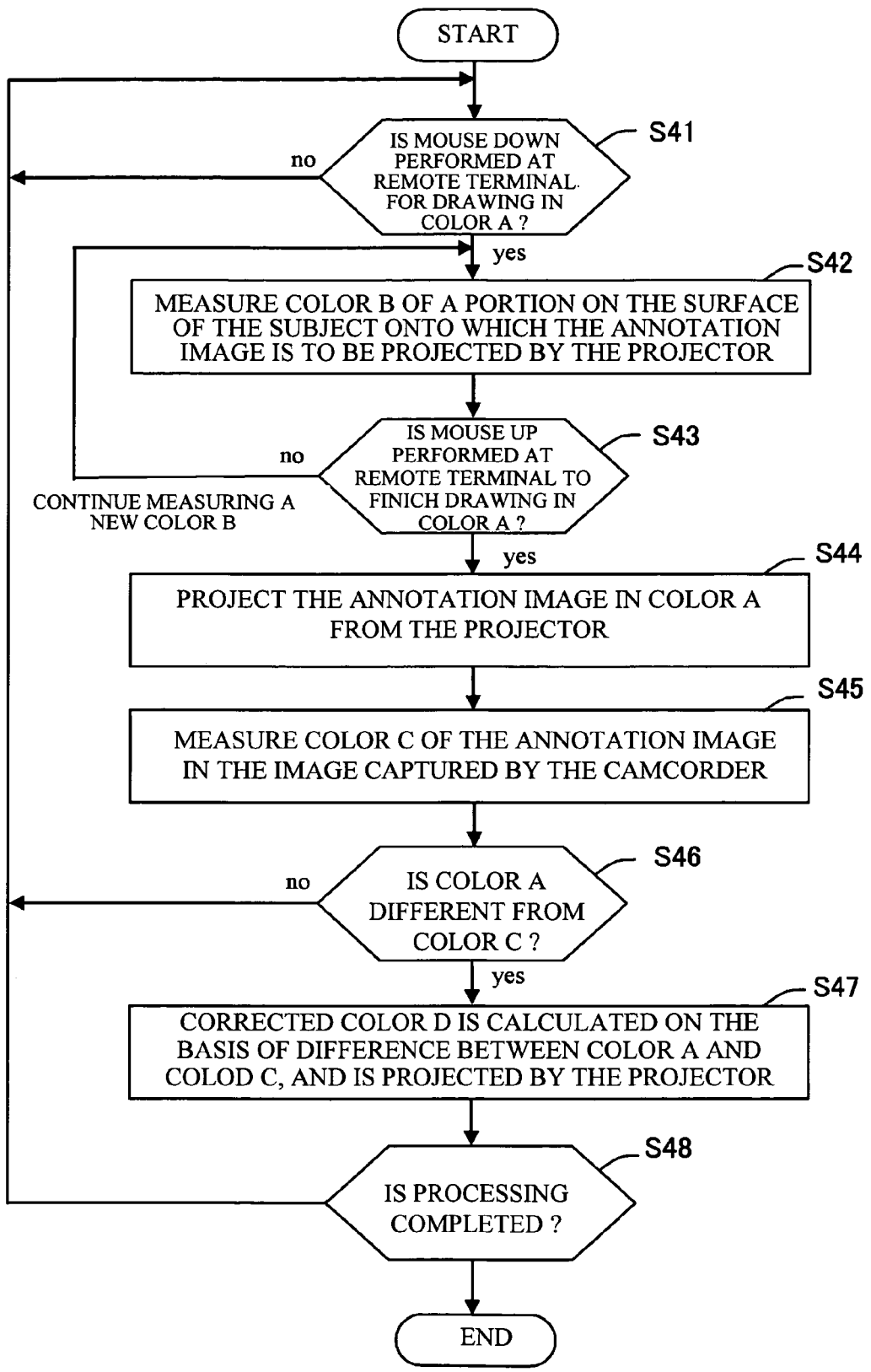
FIG. 10 is another process flowchart of a case where the color of the annotation image is converted and the annotation image is projected in the remote instruction system.

FIG. 10 is another process flowchart of a case where the color of the annotation image is converted and the annotation image is projected in the remote instruction system. In an example shown in FIG. 10, step S43 is added to the flowchart shown in FIG. 5. However, other processes are same as those shown in FIG. 5. At step S43, if a mouse up is performed to complete drawing in the color A on the remote terminal 100, the server 50 makes the projector 40 project the annotation image in the color A. Accordingly, it is possible to simplify the process subsequent to step S44 at a timing of mouse down/up in drawing in a remote site.

Here, if corresponding pixels are compared and the color of the annotation image is converted so as to compare the color of the annotation image determined on the remote terminal 100 with the reflection characteristic of the subject surface, it is possible to minimize the difference of colors between adjacent pixels as much as possible by using the minimum least squares method. The server 50 may convert the color of the annotation image by calculating an average value of the pixel values composing each annotation image and comparing the colors of the whole annotation image, when the color of the annotation image is corrected by comparing the color of the annotation image determined on the remote terminal 100 with the reflection characteristic of the subject surface.

In the description heretofore, the example of RGB color model has been described in comparison and correction of colors, yet alternative color model such as YUV, Lab, or the like may be used. In the YUV color model, Y represents luminance, U represents chrominance of blue, and V represents chrominance of red. In the Lab color model, L represents lightness, a represents a mixture ratio of two colors, green and magenta, and b represents a mixture ratio of two colors, blue and yellow.

In the color correction at step S36 as described above, if it is impossible to correct to obtain an identical color (for example, the color D becomes exceeds 1.0), it is better to combine colors (U and V in the YUV color model) on a priority basis. At this time, the luminance (Y in YUV color model) is adjusted to be a maximum as much as possible.

At step S32 and S33, if the color exceeds a dynamic range of the camcorder 20 (for example, the color B or the color C exceeds 1.0) when the color in the image is measured, the exposure of the camcorder 20 is controlled. Here, at step S36, it is better to correct the color in priority, as described. On the basis of an exposure parameter e and a characteristic function f of the camcorder 20, the camcorder 20 and the exposure parameter are set to such corrected color to calculate with the use of a following Expression (2). Here, the function f is measured in advance.

$$R_c = f(R_c, e)$$ [Expression (2)]

As described heretofore, according to an exemplary embodiment of the present invention, it is possible to project the annotation image having an identical color determined on the remote terminal onto the subject having various reflection characteristics, by measuring the reflection characteristics on the subject surface on the basis of the captured image, converting the color of the annotation image on the basis of such measured subject surface, and projecting the annotation image onto the subject. In addition, it is only necessary to measure the reflection characteristic of only a portion in the subject surface onto which the annotation image is to be projected. This eliminates the necessity of measuring the reflection characteristic of the whole surface of the subject, thereby enabling the annotation image having an identical color to the color determined on the remote terminal, with a small calculation amount. Furthermore, it is not necessary to add hardware such as a standard light source or the like, since only the annotation image is used for measuring the reflection characteristic on the subject surface. Also, when the color of the annotation image is corrected only on the basis of the reflection characteristic of the subject surface, it is necessary to measure a distance between the projector and the subject surface. However, in the remote instruction system 1 employed according to an exemplary embodiment of the present invention, the portion in the subject surface onto which the annotation image is to be projected is measured and is then fed back to the system, thereby eliminating the necessity of measuring the distance between the projector 40 and the subject surface. Also, according to an exemplary embodiment of the present invention, the reflection characteristic of the subject surface is measured for color correction, whenever the annotation image is projected. Even if a material of the subject is different or the position of the subject is moved frequently, it is possible to correct the color.

In the above-described exemplary embodiment, a description has been given of a case where the projector is used as a projection portion. However, the projection portion is not limited to the projector. For example, the image may be formed by emitting laser beams or the like at the subject.

In the above-described exemplary embodiment, the rotation stage has been described as an example of the relative position changing portion. However, the relative position changing portion is not limited to the rotation stage. For example, a robot or the like may be employed as the relative position changing portion. In the above-described exemplary embodiment, a description has been given of a case where the subject is moved. However, it may be configured in such a manner that the camcorder serving as an image capturing portion or the projector serving as a projection portion is moved.

In the above-described exemplary embodiment, a description has been given of a case where the rotation buttons R1 and R2 are formed on the display screen 111 to instruct the rotation of the rotation stage 70. However, a method of instructing the rotation is not limited to the above-described rotation buttons. A keyboard or alternative method may be employed.

In the above-described exemplary embodiment, a description has been given of a case where the remote terminal 100 is connected to the server 50 by the network 300. However, the connection is not limited to the network. An alternative method may be employed for connecting the remote terminal 100 and the server 50, and the remote terminal 100 may be provided at a side of the subject 200.

The remote instruction method employed in an exemplary embodiment of the present invention is realized by the remote instruction system 1. The server 50 or the computer 120 is composed of, for example, a Central Processing Unit (CPU), Read Only Memory (ROM), Random Access Memory (RAM), and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A remote instruction system comprising a control portion,
the control portion transmitting an image captured by an image capturing portion provided for capturing the image of a subject to a remote terminal, and controlling a projection portion to simultaneously project annotation images onto the subject according to an instruction issued from the remote terminal on the basis of the image captured,
the control portion measuring a reflection characteristic of a portion in the surface of the subject onto which each of the annotation images is to be projected on the basis of the image captured, segregating each of the annotation images on the subject, and converting a color of each of the annotation images to be projected onto the subject on the basis of a comparison result between the color of each of the annotation images instructed by the remote terminal and the reflection characteristic of the surface of the subject to project the annotation images onto the subject.

2. The remote instruction system according to claim 1, wherein the control portion measures the reflection characteristic of the portion in the surface of the subject onto which the annotation image is to be projected, by projecting the annotation image.

3. The remote instruction system according to claim 1, wherein the control portion compares corresponding pixels, when the color of the annotation image instructed by the remote terminal is compared with the reflection characteristic of the surface of the subject.

4. The remote instruction system according to claim 1, wherein the control portion compares an average value of pixel values composing each annotation image, when the color of the annotation image instructed by the remote terminal is compared with the reflection characteristic of the surface of the subject.

5. A remote instruction method comprising:

transmitting an image of a subject to a remote terminal;

controlling a projection portion to simultaneously project annotation images onto the subject according to an instruction issued from the remote terminal on the basis of the image captured;

measuring a reflection characteristic of a portion in the surface of the subject onto which each of the annotation images is to be projected on the basis of the image captured;

segregating each of the annotation images on the subject; and converting a color of each of the annotation images to be projected onto the subject on the basis of a comparison result between the color of each of the annotation images instructed by the remote terminal and the reflection characteristic of the surface of the subject to project the annotation images onto the subject.

6. The remote instruction method according to claim 5, wherein measuring measures the reflection characteristic of the portion in the surface of the subject onto which the annotation image is to be projected, by projecting the annotation image.

7. A computer readable medium storing a program causing a computer to execute a process for remote instruction, the process comprising:

transmitting an image of a subject to a remote terminal;

controlling a projection portion to simultaneously project annotation images onto the subject according to an instruction issued from the remote terminal on the basis of the image captured;

measuring a reflection characteristic of a portion in the surface of the subject onto which each of the annotation image is to be projected on the basis of the image captured;

segregating each of the annotation images on the subject and converting a color of each of the annotation images to be projected onto the subject on the basis of a comparison result between the color of each of the annotation images instructed by the remote terminal and the reflection characteristic of the surface of the subject to project the annotation images onto the subject.

8. A remote instruction system comprising a control portion, the control portion transmitting an image captured by an image capturing portion provided for capturing the image of a subject to a remote terminal, and controlling a projection portion to simultaneously project annotation images onto the subject according to an instruction issued from the remote terminal on the basis of the image captured, the control portion measuring a reflection characteristic of a portion in the surface of the subject onto which each of the annotation images is to be projected on the basis of the image captured, segregating each of the annotation images on the subject, and converting a color of each of the annotation images to be projected onto the subject on the basis of a comparison result between the color of each of the annotation images instructed by the remote terminal and the reflection characteristic of the surface of the subject to project the annotation images onto the subject, wherein the control portion compares corresponding pixels, when the color of the annotation image instructed by the remote terminal is compared with the reflection characteristic of the surface of the subject.

9. The remote instruction system according to claim 1, further comprising a positioning portion for manipulating a position or orientation of the subject.

10. The remote instruction system according to claim 1, wherein the control portion makes the projection portion project the annotation image in the color instructed by the remote terminal if a mouse up is performed to complete drawing in the color.

11. The remote instruction system according to claim 3, wherein the control portion compares corresponding pixels by using the minimum least squares method, when the color of the annotation image instructed by the remote terminal is compared with the reflection characteristic of the surface of the subject.

12. The remote instruction system according to claim 8, wherein the control portion compares corresponding pixels by using the minimum least squares method, when the color of the annotation image instructed by the remote terminal is compared with the reflection characteristic of the surface of the subject.

* * * * *